(12) United States Patent
Veeser et al.

(10) Patent No.: US 8,709,139 B2
(45) Date of Patent: Apr. 29, 2014

(54) LAYER FOR USE IN A HEPA FILTER ELEMENT

(75) Inventors: Klauss Veeser, Weinheim (DE); Armin Greiner, Weinheim (DE); Harold Von Schischka, Oestringen (DE); Juergen Adolph, Stockstadt (DE); Toan-Hieu Giang, Viernheim (DE)

(73) Assignee: Carl Freudenberg KG, Weinheim (DE)

( * ) Notice: Subject to any disclaimer, the term of this patent is extended or adjusted under 35 U.S.C. 154(b) by 431 days.

(21) Appl. No.: 12/527,950

(22) PCT Filed: Dec. 3, 2007

(86) PCT No.: PCT/EP2007/010482
§ 371 (c)(1),
(2), (4) Date: Aug. 20, 2009

(87) PCT Pub. No.: WO2008/107006
PCT Pub. Date: Sep. 12, 2008

(65) Prior Publication Data
US 2010/0101199 A1   Apr. 29, 2010

(30) Foreign Application Priority Data
Mar. 7, 2007 (DE) .......................... 10 2007 011 365

(51) Int. Cl.
*B01D 39/04* (2006.01)

(52) U.S. Cl.
USPC ........... 96/66; 55/486; 55/524; 55/528; 96/69

(58) Field of Classification Search
USPC .................. 55/482–489, 490–519, 522–528, 55/342–350.1, 521, DIG. 39; 96/15–100; 442/327–417; 95/273–287
See application file for complete search history.

(56) References Cited

U.S. PATENT DOCUMENTS

| | | | | |
|---|---|---|---|---|
| 5,063,926 A | * | 11/1991 | Forsgren et al. | 128/206.17 |
| 5,240,479 A | * | 8/1993 | Bachinski | 96/17 |
| 5,441,550 A | * | 8/1995 | Hassenboehler et al. | 55/486 |
| 5,709,735 A | * | 1/1998 | Midkiff et al. | 96/17 |

(Continued)

FOREIGN PATENT DOCUMENTS

| | | |
|---|---|---|
| DE | 10013315 | 9/2001 |
| EP | 1089802 | 4/2001 |

(Continued)

OTHER PUBLICATIONS

International Search Report and Written Opinion dated Mar. 4, 2008 issued in related International Patent Application No. PCT/EP2007/010482.

*Primary Examiner* — Duane Smith
*Assistant Examiner* — Thomas McKenzie
(74) *Attorney, Agent, or Firm* — Grossman, Tucker, Perreault & Pfleger, PLLC

(57) ABSTRACT

A layer for use in a HEPA filter element solves the problem of disclosing a filter element which satisfies HEPA requirements. Said layer comprises a first support layer (1) for stabilization which contains polypropylene fibers, and a second deposition layer (2) which contains polypropylene fibers, wherein the polypropylene fibers of the deposition layer (2) are at least partially electrostatically charged, and wherein the support layer (1) and the deposition layer (2) are constructed as nonwoven material which is at least partially free of glass fiber. The layer according to the invention can be easily pleated while having excellent filter efficiency.

13 Claims, 5 Drawing Sheets

(56) References Cited

U.S. PATENT DOCUMENTS

| | | |
|---|---|---|
| 5,900,305 A | 5/1999 | Chapman |
| 5,955,174 A | 9/1999 | Wadsworth |
| 6,488,731 B2 | 12/2002 | Schultheiss et al. |
| 6,759,357 B1 * | 7/2004 | Toriumi ............... 442/375 |
| 2003/0177909 A1 * | 9/2003 | Koslow ............... 96/154 |
| 2004/0083695 A1 * | 5/2004 | Schultink et al. ....... 55/382 |
| 2004/0116028 A1 * | 6/2004 | Bryner ............... 442/381 |
| 2004/0161992 A1 * | 8/2004 | Clark et al. ........... 442/340 |
| 2004/0211160 A1 * | 10/2004 | Rammig et al. ......... 55/382 |
| 2005/0041312 A1 * | 2/2005 | Sommer et al. ........ 359/837 |
| 2005/0161387 A1 | 7/2005 | Van de Graaf et al. |
| 2006/0000196 A1 * | 1/2006 | Beier et al. ............ 55/497 |
| 2006/0060085 A1 | 3/2006 | Ptak et al. |
| 2006/0240733 A1 * | 10/2006 | Bieser et al. .......... 442/414 |
| 2006/0286343 A1 * | 12/2006 | Curro et al. .......... 428/131 |
| 2007/0084786 A1 * | 4/2007 | Smithies ............. 210/490 |

FOREIGN PATENT DOCUMENTS

| | | |
|---|---|---|
| EP | 1134013 | 9/2001 |
| EP | 1163038 | 12/2001 |
| EP | 1545741 | 6/2005 |
| WO | 0152995 | 7/2001 |
| WO | 0160496 | 8/2001 |
| WO | 02089956 | 11/2002 |
| WO | 2004028662 | 4/2004 |

* cited by examiner

LAYER FOR USE IN A HEPA FILTER ELEMENT

TECHNICAL FIELD

The invention relates to a ply for use in a HEPA filter element.

STATE OF THE ART

Filter elements that satisfy HEPA requirements are already known from the state of the art. HEPA filter elements can be configured as suspended substance filters that serve to filter more than 99.9% of all particles that are larger than 0.1 to 0.3 μm from the air.

These particles can comprise viruses, dust that enters the lungs, mite eggs and excretions, pollen, smoke particles, asbestos, bacteria, various toxic dusts and aerosols.

HEPA filter elements are used, among other things, in the medical sector, particularly in operating rooms, intensive-care units, and laboratories. Furthermore, uses in clean rooms and in nuclear technology are known.

The European standard for the classification of a HEPA filter element is DIN EN 1822 with the filter classes H10 to H14 (HEPA). It is known that particles having a size of 0.1 to 0.3 μm are most difficult to precipitate. The particle size of the particles that are most difficult to precipitate under certain conditions, in each instance, is classified with the designation MPPS ("[in English:] most penetrating particle size"). For this reason, HEPA filter elements are classified with regard to their effectiveness related to this particle size, by means of a test aerosol. The test aerosol is called DEHS (di-2-ethylhexyl sebacate).

While the filter elements known from the state of the art frequently demonstrate good to very good filter efficiency, they are made from materials that can be hazardous to the health of human beings. For example, HEPA filter elements are known that contain glass fibers to a significant extent. Glass fibers can exit from the ply from which the filter element is made and harm the human organism.

Furthermore, the known plies for HEPA filter elements cannot be pleated without problems, since glass fibers undergo severe mechanical stress during pleating and break easily. The pleated filter elements are not very elastic and tend to form breakage locations. The breakage locations form holes or perforations that have a negative impact on the filter efficiency. Such a filter can no longer meet HEPA requirements, since undesirable particles can pass through the damaged locations that have formed.

PRESENTATION OF THE INVENTION

The invention is therefore based on the task of creating a ply for use in a HEPA filter element that can be pleated without problems, at high filter efficiency.

According to the invention, the above task is accomplished with a ply for use in a HEPA filter element, the ply comprising a first carrier layer that contains polypropylene fibers, for stabilization, and a second precipitation layer that contains polypropylene fibers, where the polypropylene fibers of the precipitation layer are electrostatically charged, at least in part, and where the carrier layer and the precipitation layer are configured as nonwoven fabrics that are free of glass fibers, at least in certain regions.

According to the invention, it has been recognized that the use of nonwoven fabrics made of polypropylene fibers allows the formation of a very elastic and pleatable ply having a suitable porosity. Furthermore, it has been recognized that the reduction or elimination of glass fibers increases the elasticity of the ply and avoids damaged locations. Breakage locations due to great fragility of the ply are avoided, according to the invention. Finally, it has been recognized that nonwoven fabrics made of polypropylene fibers can be thermally connected with one another, without problems, in that pleating of the carrier layer and the precipitation layer, which have been connected with one another, is possible practically without any displacement of the layers relative to one another. Consequently, the task stated initially has been accomplished.

Against this background, it is possible, in concrete terms, that neither the carrier layer nor the precipitation layer has glass fibers, namely that the carrier layer and the precipitation layer are configured to be free of glass fibers. By means of this concrete embodiment, a ply can be produced that does not contain any materials that are harmful to human beings.

The carrier layer could have a weight per unit area of 70 to 200 $g/m^2$. The selection of this weight per unit area allows sufficient stabilization of the ply so that it can be pleated. Furthermore, the selection of this weight per unit area allows the application of a very thin and highly porous precipitation layer, which in itself has only very slight rigidity, and does not make any contribution to the overall stiffness of the ply.

The polypropylene fibers of the carrier layer can be electrostatically charged. This concrete embodiment allows the use of the carrier layer as a pre-precipitation layer or pre-filter.

The precipitation layer could have a weight per unit area of 10 to 80 $g/m^2$. This range has surprisingly been shown to be particularly suitable for meeting HEPA requirements. In this connection, the porosity can be adjusted as a function of the fineness of the fibers. The finer the fibers used, the lower the weight per unit area can be selected to be, in order to meet the requirements of the filter class, in each instance.

Against this background, it is possible that the precipitation layer has nanofibers that are made from polyamide, polacrylonitrile, or polycarbonate. Furthermore, it is possible that a layer of nanofibers made of the aforementioned materials is applied to the precipitation layer. Nanofibers allow precipitation of even the smallest particles and can significantly increase the filter efficiency of the ply being described here.

The ply could have a third layer that contains polypropylene fibers, which has a weight per unit area of at least 8 $g/m^2$ and encloses the precipitation layer, together with the carrier layer, in the manner of a sandwich. This concrete embodiment is suitable for production of the ply using a melt-blown process. The third layer furthermore represents a protective layer for the precipitation layer, to protect it from friction wear and electrical discharge. The third layer allows the passage of air without significant resistance, so that it is particularly suitable as a substratum when applying the precipitation layer by means of a melt-blown process. In this connection, the polypropylene fibers of the precipitation layer applied by means of the melt-blown process enter into a material-fit connection with the third layer, in that they adhere to the fibers of the third layer.

Against this background, the polypropylene fibers of the carrier layer can contain core/mantle fibers having a mantle made of metallocene/polypropylene and a core made of pure polypropylene. This concrete embodiment allows melting of the mantle, without the core being impaired in its polymer structure. By means of melting of the mantle, the individual core/mantle fibers can enter into a bond both with one another and with the polypropylene fibers of the precipitation layer. In very concrete terms, it is possible that the carrier layer is prefinished and connected with the precipitation layer and the third layer by means of ultrasound bonding.

The polypropylene fibers of the precipitation layer could be configured as melt-blown fibers having an average diameter of 1 to 2 μm. This concrete embodiment allows the creation of a nonwoven fabric having very small pores. Because of the fine porosity, very fine particles can be precipitated, so that the ply satisfies HEPA requirements.

The polypropylene fibers of the third layer can be thermally connected with one another at certain points. The polypropylene fibers of the third layer could be connected with one another, in concrete terms, by means of a "point seal" method. In this connection, individual point regions of the polypropylene fibers are partially melted and changed, in terms of their polymer structure, in such a way that they become brittle. The brittle regions of different polypropylene fibers that have melted together are only present at certain points, however, so that the third layer as a planar structure is movable and deformable as a whole, without breaking.

The carrier layer, the precipitation layer, and the third layer could be thermally connected with one another by means of ultrasound-bonded or laser-bonded regions, in such a way that the ply is pleatable. The ultrasound-bonded or laser-bonded regions could be provided in the form of line patterns or dot patterns. In this way, it is assured that non-bonded regions are present between the bonded regions, and can be bent or pleated without being destroyed. The bonded regions are frequently brittle because of the thermal impact. Against this background, it is possible, in concrete terms, that the bonded regions connect all three layers with one another, that the polypropylene fibers in each of the layers are partially melted and join together to form a composite that passes through the layers.

The ply could have a weight per unit area of 160 g/m$^2$, a thickness of 0.92 m, and an air permeability of 315 dm$^3$/m$^2$s at a pressure difference of 200 Pa, where the pressure difference prevails between inflow side and outflow side of the ply. It has surprisingly been shown that a ply having this thickness and this weight per unit area demonstrates the stated air permeability at the stated pressure difference. Such a ply is particularly suitable for use in room air purifiers, since the room air purifier can work at low electrical power consumption. In this regard, gentle and cost-advantageous operation of a room air purifier is made possible.

The ply could bring about a pressure drop from the inflow side to the outflow side of at most 100 Pa at an inflow velocity of a gaseous medium to be filtered of 15 cm/s. Such a ply is particularly suited for use in devices that draw air from a first space into a second space. The low pressure drop from the inflow side to the outflow side allows gentle operation of the suction unit, since this unit has to do little work in order to draw a gaseous medium to be filtered through the ply. Against this background, it is possible that the pressure drop at an inflow velocity of 5 cm/s is less than 40 Pa, and less than 80 Pa at an inflow velocity of 10 cm/s. A ply that demonstrates these properties is particularly suitable for use in electrically operated filter systems, particularly in room air purifiers.

The ply could have a filter efficiency of at least 85% at an inflow velocity of a gaseous medium of at most 8 cm/s. In very concrete terms, it is possible that the test aerosol DEHS according to the European standard DIN EN 1822 is used as a gaseous medium. If this test aerosol impacts the inflow side of the ply at 8 cm/s, at least 85% of the particles that are most difficult to precipitate are precipitated. These particles that are most difficult to precipitate have a specific particle size, namely the MPPS ("most penetrating particle size"). A ply that demonstrates this property is suitable for use in a HEPA filter element, since it satisfies the requirements for filters of filter class H10.

A filter element could comprise a folded bellows, where the folded bellows is made from a pleated ply, and where the folded bellows is inserted into a filter door. Such a filter element is suitable as a module for a room air purifier, since the filter element can be inserted into an existing system together with the filter door. If the folded bellows is made from a ply described here, the filter element is configured as a HEPA filter element.

The filter door could have a perforated bottom to which an at least partly circumferential frame is assigned, which encloses the folded bellows. By means of this concrete configuration, the folded bellows can be glued into the frame, thereby avoiding cracks and gaps in the frame region. Because of the perforations in the bottom, it is ensured that the medium to be filtered penetrates through the perforations and passes through the pleated ply of the folded bellows. The medium to be filtered is prevented from flowing past the ply through gaps or cracks between the folded bellows and the frame because the folded bellows is glued in.

There are now various possibilities for configuring and further developing the teaching of the present invention in advantageous manner. For this purpose, reference is made to the dependent claims, on the one hand, and, on the other hand, to the following explanation of a preferred exemplary embodiment of the invention, using the drawing.

BRIEF DESCRIPTION OF THE DRAWING

The drawing shows, in

IMPLEMENTATION OF THE INVENTION

Figure 1:
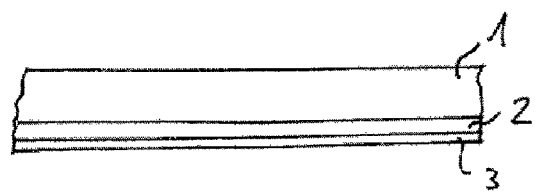
FIG. 1 in a schematic view, a ply that has three layers.

FIG. 1 shows a ply for use in a filter element, comprising a first carrier layer 1 that contains polypropylene fibers, for stabilization, and a second precipitation layer 2 that contains polypropylene fibers. The polypropylene fibers of the precipitation layer 2 are electrostatically charged, at least in part. The carrier layer 1 can also be electrostatically charged and serve as a pre-precipitator or pre-filter. The carrier layer 1 and the precipitation layer 2 are configured as nonwoven fabrics that are free of glass fibers.

The carrier layer 1 has a weight per unit area of 110 g/m$^2$ and is made from polypropylene fibers. The polypropylene fibers of the carrier layer 1 are configured as core/mantle fibers having a mantle made of metallocene/polypropylene and a core made of pure polypropylene.

The precipitation layer has a weight per unit area of 36 g/m$^2$ and is made from polypropylene fibers. The polypropylene fibers are configured as electret microfibers. The polypropylene fibers of the precipitation layer 2 are applied to the third layer 3 by means of a melt-blown process, which third layer has a weight per unit area of 14 g/m$^2$. The third layer 3 also consists of polypropylene fibers and functions as protection for a substratum onto which the polypropylene fibers of the precipitation layer 2 are applied during a meltblown process.

The third layer 3 has polypropylene fibers that are thermally connected with one another by means of a "point seal" process. The third layer 3 and the carrier layer 1 enclose the precipitation layer 2 between them, in the manner of a sandwich.

In the concrete aforementioned concrete exemplary embodiment, the carrier layer 1, the precipitation layer 2, and the third layer 3 contain exclusively polypropylene fibers and are complete free of glass fibers. For this reason, the ply described in concrete terms here can be completely incinerated and is easy to dispose of.

The ply described in the concrete exemplary embodiment has a weight per unit area of 160 g/m² and a thickness of 0.92 mm. At a pressure difference of 200 Pa that occurs between inflow side and outflow side of the ply, the ply demonstrates an air permeability of 315 dm³/m²s.

In the following table, inflow velocities, pressure drops, efficiencies for the MPPS, in each instance, penetrations as well as particle sizes MPPS are shown. These measurement results were determined by means of measurements in accordance with DIN EN 1822, using the ply described in the concrete exemplary embodiment.

TABLE

| Inflow velocity (cm/s) | Pressure drop (Pa) | Efficiency for MPPS (%) | Penetration (%) | MPPS (μm) |
| --- | --- | --- | --- | --- |
| 1.3 | 10 | 98.8 | 1.2 | 0.071 |
| 2.6 | 19 | 97.2 | 2.8 | 0.069 |
| 5.3 | 38 | 89.5 | 10.5 | 0.055 |
| 14.0 | 101 | 79.9 | 20.1 | 0.059 |
| 30.0 | 181 | 77.9 | 22.1 | 0.057 |

Figure 5:
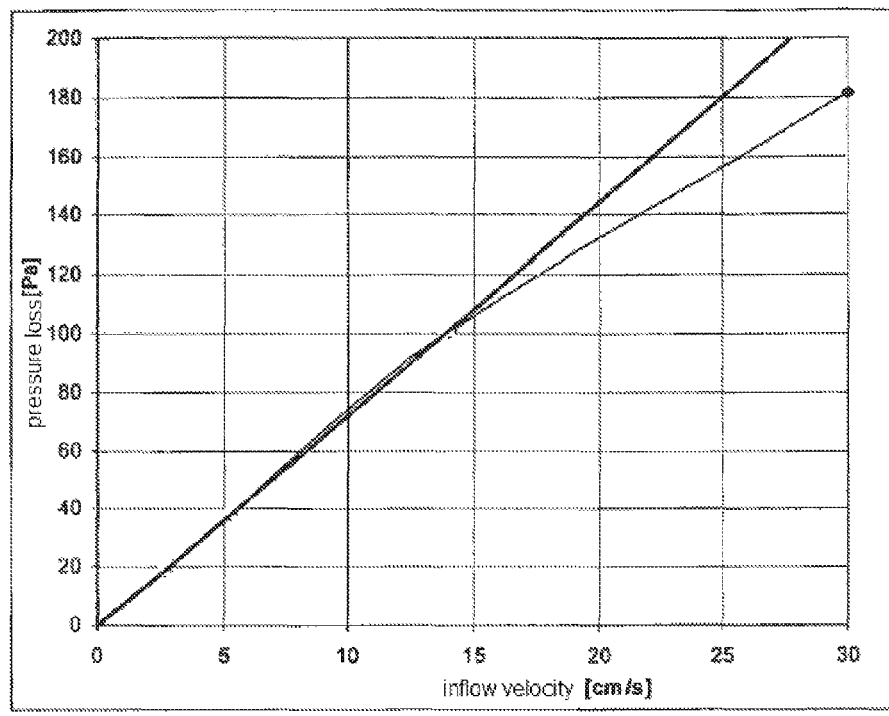

FIG. 5 shows the pressure drop from the inflow side to the outflow side of the ply as a function of the inflow velocity. It can be clearly seen in FIG. 5 that at an inflow velocity of 15 cm/sec, the pressure drop amounts to at most 110 Pa. In this regard, the ply according to the invention demonstrates an excellent permeability for a medium to be filtered, thereby making it possible to operate electric motors of suction units in cost-advantageous and gentle manner. In FIG. 5, a regression straight line is drawn in, which was determined from the measurements. It can clearly be seen from FIG. 5 that there is a linear dependence of the pressure drop on the inflow velocity, at least up to an inflow velocity of 15 cm/s.

Figure 6:
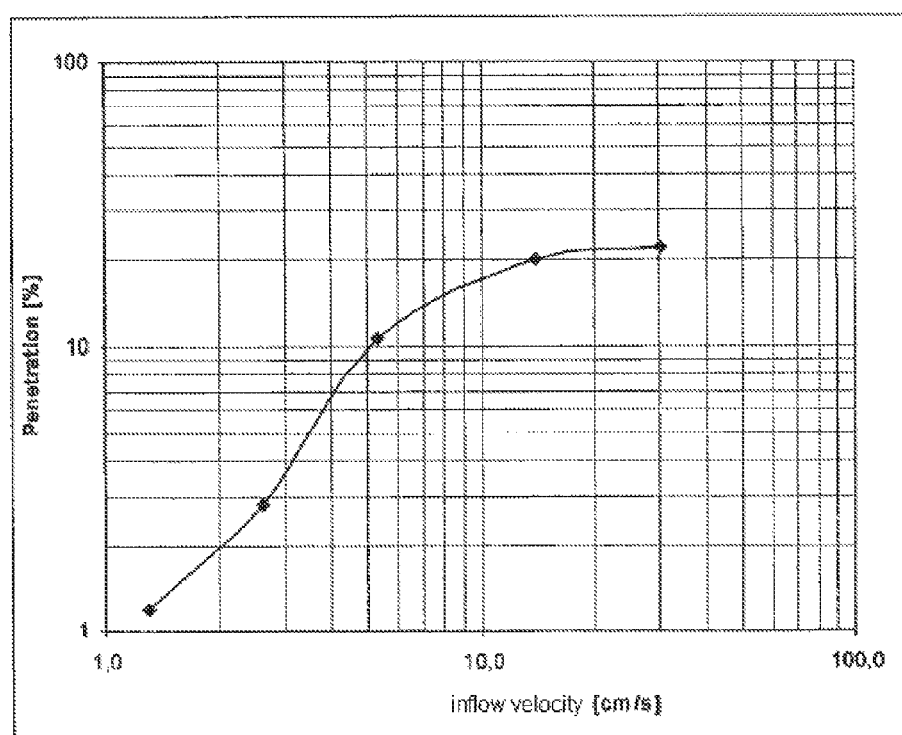

FIG. 6 shows the penetration of the particles that are most difficult to precipitate, as a function of the inflow velocity. It can be seen from the table that at an inflow velocity of 1.3 cm/sec, the diameter of the particles that are most difficult to precipitate is 0.071 μm. This means that 98.8% of the particles that are most difficult to precipitate at the inflow velocity of 1.3 cm/sec are precipitated by the ply according to the invention. At an inflow velocity of 5.3 cm/sec, 89.5% of the particles most difficult to precipitate are precipitated. In this regard, the ply according to the invention demonstrates filter properties that make it suitable for use in HEPA filter elements.

Figure 2:
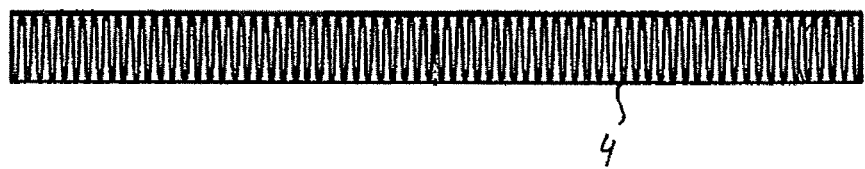
FIG. 2 a sectional view of a folded bellows that has been made from a pleated ply according to FIG. 1, FIG. 3 a top view of the folded bellows according to FIG. 2, FIG. 4 a top view of the filter door into which the folded bellows according to FIG. 3 is inserted, FIG. 5 a diagram that shows the pressure drop between inflow side and outflow side of a ply as a function of the inflow velocity, and FIG. 6 a diagram that shows the penetration of the particles to be precipitated, as a function of the inflow velocity, in a double-logarithmic representation.

FIG. 2 shows a folded bellows 4 that is made from a ply of the type described here. The ply is pleated and has 70 double pleats.

Figure 3:
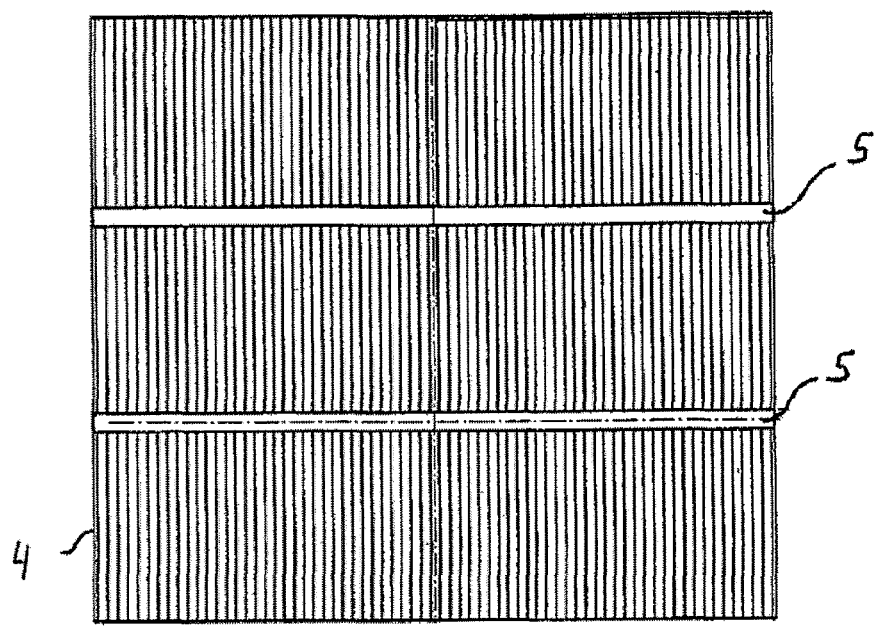

FIG. 3 shows the folded bellows 4 in a top view. The folded bellows 4 has strip-shaped elements 5 assigned to it, which are connected with the backs of the folds. The strip-shaped elements 5 keep the backs of the folds, and thus the folds, spaced apart. In this way, the folds are prevented from sticking together or hanging together when flow through them takes place.

Figure 4:
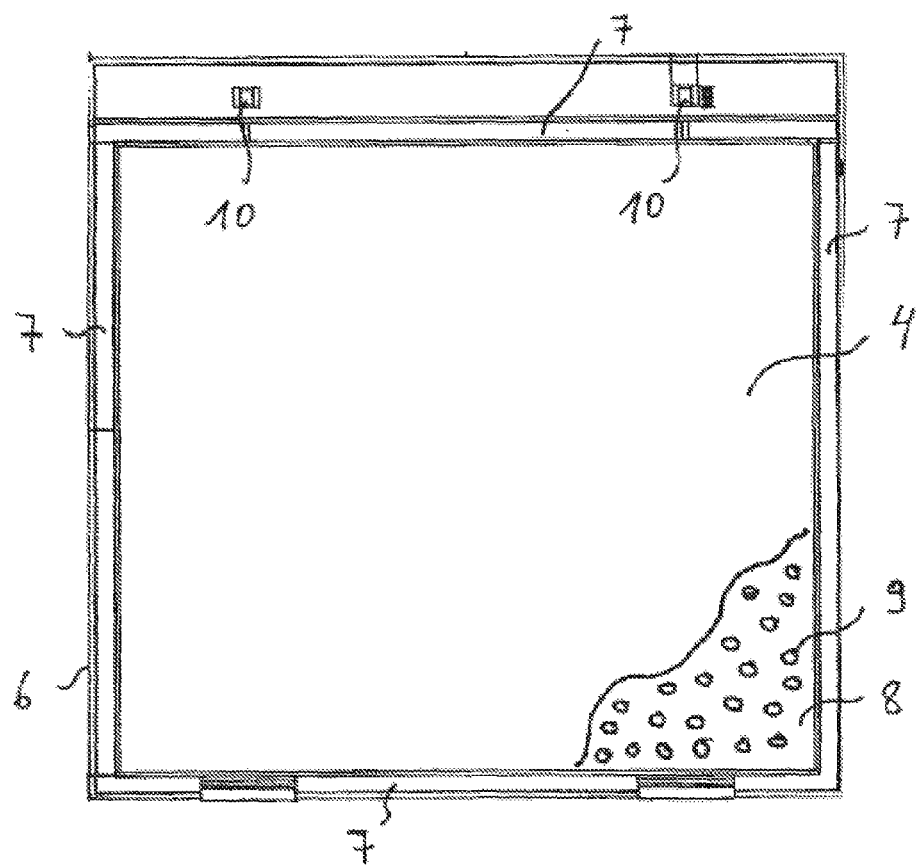

FIG. 4 shows a filter door 6 into which the folded bellows according to FIG. 3 is glued. The filter door 6 encompasses the folded bellows 4 with a frame 7, where adhesive is introduced between the frame 7 and the folded bellows 4, in order to prevent the formation of slits or gaps.

The filter door 6 has a bottom 8 that is exposed here by a partial break in the folded bellows 4. The bottom 8 has perforations 9 through which the medium to be filtered can flow in. The filter door 6 furthermore has engagement projections 10 that can be locked into an accommodation of a room air purifier. In this way, the filter door 6 can be used as a module, together with the folded bellows 4.

The ply described here, i.e. the filter element described here, can serve as an air filter to filter microorganisms out of contaminated air. In this connection, the ply, i.e. the filter element demonstrates a particularly advantageous ratio of filter efficiency and pressure drop.

The ply described here and the filter element described here demonstrate no release of microfibers from the ply into the ambient air. In this regard, the ply and the filter element can be used in areas in which allergic persons are present.

The use of hydrophobic fibers, namely polypropylene fibers, prevents the growth of bacteria, fungi, and similar harmful substances on the surface of the ply, i.e. of the filter element. Furthermore, the ply can be completely incinerated.

Because of the properties described here, the ply is particularly suited for use in air filter elements for room air purifiers or for air filter elements in hospitals.

With regard to other advantageous embodiments and further developments of the teaching according to the invention, reference is made to the general part of the specification, on the one hand, and to the attached claims, on the other hand.

In conclusion, it should be explicitly emphasized that the above exemplary embodiment, which was arbitrarily selected simply as an example, serves only to explain the teaching according to the invention, but does not restrict this teaching to this exemplary embodiment.

What is claimed is:
1. A ply for use in a HEPA filter element, comprising:
a first carrier layer, said first carrier layer comprising first polypropylene fibers having a core/mantle structure, said mantle comprising metallocene catalyzed polypropylene, said core comprising pure polypropylene wherein melting of said mantle fibers occurs without the core structure being impaired, said first polypropylene fibers being electrostatically charged for stabilization; and
a second precipitation layer, said second precipitation layer comprising second polypropylene fibers, where said second polypropylene fibers are at least in part electrostatically charged and wherein said precipitation layer includes nanofibers selected from polyamide, polyacrylonitrile, polycarbonate or polypropylene;
wherein:
said first carrier layer and said second precipitation layer are configured as nonwoven fabrics such that at least certain regions are free of glass fibers; and
said first carrier layer and said second precipitation layer are bonded such that at least a portion of said first polypropylene fibers and said second polypropylene fibers are at least partially melted and bond together to form a composite that passes through said first carrier layer and said second precipitation layer and said filter element includes regions capable of bending or pleating.

2. The ply according to claim 1, wherein the first carrier layer has a weight per unit area of 70 to 200 g/m².

3. The ply according to claim 1, wherein the second precipitation layer has a weight per unit area of 10 to 80 g/m².

4. The ply according to claim 1, further comprising a third layer, said third layer comprising third polypropylene fibers and having a weight per unit area of at least 8 g/m², wherein:

said second precipitation layer has a first surface and a second surface;

said third layer is on said first surface and said first carrier layer is on said second surface; and said first carrier layer, second precipitation layer, and third layer are bonded such that at least a portion of said first, second and third polypropylene fibers are at least partially melted and bond together to form a composite that passes through said first carrier layer, second precipitation layer, and third layer.

5. The ply according to claim 1, wherein the polypropylene fibers of the second precipitation layer are configured as melt-blown fibers having an average diameter of about 1 to 2 μm.

6. The ply according to claim 4, wherein the polypropylene fibers of the third layer are thermally bonded to one another at certain points.

7. The ply according to claim 4, wherein the first carrier layer, the second precipitation layer, and the third layer contain exclusively polypropylene fibers.

8. The ply according to claim 4, wherein the first carrier layer, the second precipitation layer, and the third layer are thermally connected with one another by means of ultrasound-bonded or laser-bonded regions, in such a way that the ply can be pleated.

9. The ply according to claim 1, wherein said ply exhibits a weight per unit area of about 160 g/m², a thickness of about 0.92 mm, and an air permeability of about 315 dm³/m²s at a pressure difference of about 200 Pa that prevails between an inflow side and an outflow side of said ply.

10. The ply according to claim 1, wherein said ply exhibits a pressure drop from an inflow side to an outflow side of at most 100 Pa at an inflow velocity of a gaseous medium to be filtered of 15 cm/s.

11. The ply according to claim 1, wherein said ply exhibits a filter efficiency of at least 85% at an inflow velocity of a gaseous medium of at most 8 cm/s.

12. A filter element comprising a folded bellows, where the folded bellows is made from a pleated ply, the pleated ply being made from a ply according to claim 1, and where the folded bellows is inserted into a filter door.

13. The filter element according to claim 12, wherein the filter door has a perforated bottom to which an at least partly circumferential frame is assigned, which encloses the folded bellows.

* * * * *